(12) United States Patent
Park et al.

(10) Patent No.: US 6,781,653 B2
(45) Date of Patent: Aug. 24, 2004

(54) LCD DEVICE HAVING A REFLECTIVE ELECTRODE AND A FABRICATING METHOD THEREOF

(75) Inventors: Sung-Il Park, Anyang-shi (KR); Jae-Young Chung, Pusan (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/785,424

(22) Filed: Feb. 20, 2001

(65) Prior Publication Data

US 2002/0001047 A1 Jan. 3, 2002

(30) Foreign Application Priority Data

Feb. 18, 2000 (KR) .......................................... 2000-7713

(51) Int. Cl.$^7$ .......................................... G02F 1/1335
(52) U.S. Cl. .......................................... 349/113; 349/43
(58) Field of Search .......................... 349/113, 43, 187, 349/138, 122; 438/30

(56) References Cited

U.S. PATENT DOCUMENTS 4,431,272 A * 2/1984 Yazawa et al. ............. 349/113
5,691,791 A * 11/1997 Nakamura et al. .......... 349/113
5,949,507 A * 9/1999 Shimada et al. ............ 349/113
6,038,008 A * 3/2000 Kim et al. .................. 349/138
6,081,310 A * 6/2000 Katsuya et al. ............. 349/113
6,124,911 A * 9/2000 Nakamura et al. .......... 349/113
6,292,241 B1 * 9/2001 Hirano ....................... 349/113

FOREIGN PATENT DOCUMENTS

JP            10161158 A  *  6/1998  ........... G02F/1/136

* cited by examiner

Primary Examiner—Dung T. Nguyen
Assistant Examiner—David Chung
(74) Attorney, Agent, or Firm—McKenna Long & Aldridge LLP (57) ABSTRACT

A method of fabricating a liquid crystal display device includes forming an embossed reflective electrode. In the method, the embossed reflective electrode is embossed via a dry-etching method with a mixture of $SF_6+O_2$ or $CF_4+O_2$ gases, or with oxygen gas, such that a plurality of small concave and convex portions are formed on the reflective electrode. Since the concave and convex portions of the reflective electrode diffuse light, high luminance and wide viewing angle can be achieved.

31 Claims, 5 Drawing Sheets

LCD DEVICE HAVING A REFLECTIVE ELECTRODE AND A FABRICATING METHOD THEREOF

This application claims the benefit of Korean Patent Application No. 2000-7713, filed on Feb. 18, 2000, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device implementing an embossed reflective electrode.

2. Discussion of the Related Art

Recently, liquid crystal display (LCD) devices with light, thin, and low power consumption characteristics are used in office automation equipment and video units and the like. Such LCDs typically use a liquid crystal (LC) with an optical anisotropy. The LC has thin and long LC molecules, which causes an orientational alignment of the LC molecules. Therefore, the alignment direction of the LC molecules is controlled by applying an electric field to the LC molecules. When the alignment direction of the LC molecules for each pixel is properly adjusted by applying an electric field, the transmittance for each pixel is changed. Therefore, the LCD can display image data.

At this time, an active matrix (AM) LCD, where a plurality of thin film transistors (TFTs) and pixel electrodes are arranged in the shape of an array matrix, is widely used because of its high resolution and superiority in displaying moving pictures. When each TFT serves to switch a corresponding pixel, the switched pixel transmits an incident light in a normally-black mode LCD. Since an amorphous silicon layer is relatively easily formed on a large inexpensive glass substrate, an amorphous silicon thin film transistor (a-Si:H TFT) is widely used.

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed therebetween. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

The transmissive LCD device requires a high, initial brightness, and thus electrical power consumption by the backlight device increases. A relatively heavy battery is needed to supply a sufficient power to the backlight of such a device, and the battery can not be used for a lengthy period of time.

In order to overcome the problems described above, the reflective LCD has been developed. Since the reflective LCD device uses ambient light, it is light and easy to carry. In addition, the reflective LCD device is superior in aperture ratio to the transmissive LCD device.

Figure 1:
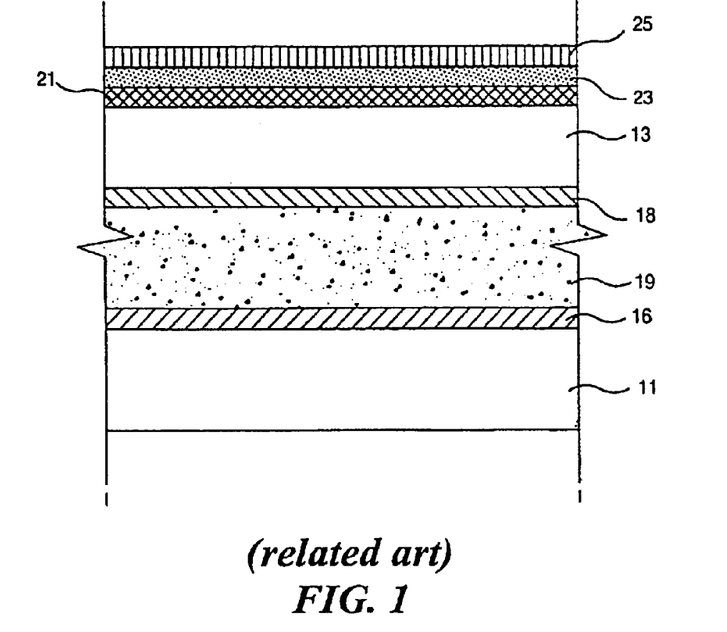
FIG. 1 is a conceptual cross-sectional view illustrating a reflective liquid crystal display device according to the related art.

FIG. 1 is a cross-sectional view illustrating a conventional reflective LCD device. As shown, between upper substrate 13 and lower substrate 11, a liquid crystal layer 19 is interposed, and between the liquid crystal layer 19 and lower substrate 11, a reflective electrode 16 is interposed. A common electrode 18 is interposed between the upper substrate 13 and liquid crystal layer 19, and on the exterior surface of the upper substrate 13, diffusing plate 21, retardation film 23, and polarizer 25 are sequentially formed.

The liquid crystal layer 19 has an optical anisotropy and controls the passage of light according to an electric field applied to the liquid crystal layer 19. A certain medium having a similar optical anisotropy may be used instead of the liquid crystal layer 19. The diffusion plate 21, retardation film 23, and polarizer 25 control the polarization state of light. Specifically, the diffusion plate 21 diffuses light to provide a wide viewing angle for users, while the retardation film 23 changes the polarization state of the incident light. In this case, a quarter-wave plate is used as the retardation film 23. The polarizer 25 transmits only rays parallel to a transmittance axis of the polarizer 25.

Figure 2:
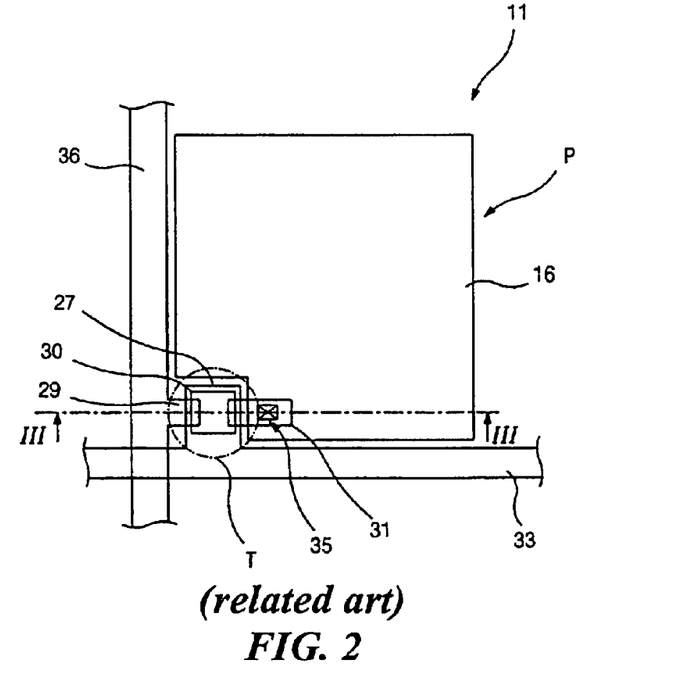
FIG. 2 is a plan view of a conventional reflective LCD device.

FIG. 2 is a plan view illustrating a pixel region of the conventional reflective LCD device. As shown, the pixel region "P" is defined by transverse gate line 33 and perpendicular data line 36, which cross each other. On the pixel region "P," the reflective electrode 16 is formed, and at the cross point between the gate and data lines 33 and 36, a thin film transistor (TFT) "T" is formed as a switching device. The TFT "T" includes gate electrode 27, source electrode 29, and drain electrode 31. The source electrode 29 and the gate electrode 27 are electrically connected with the data line 36 and gate line 33, respectively. In addition, an active layer 30 is formed to overlap the gate electrode 27. The active layer 30 serves as a channel. Electric charges pass through the channel to transfer image data between the drain and source electrodes 31 and 29.

Still referring to FIG. 2, the reflective electrode 16 electrically contacts the drain electrode 31 via a drain contact hole 35. The reflective electrode 16 made of an opaque metal reflects an ambient light to the liquid crystal layer 19 (see FIG. 3). In addition, the reflective electrode 16 and common electrode 18 (see FIG. 3) apply electric signals to the liquid crystal layer 19 (see FIG. 3).

Figure 3:
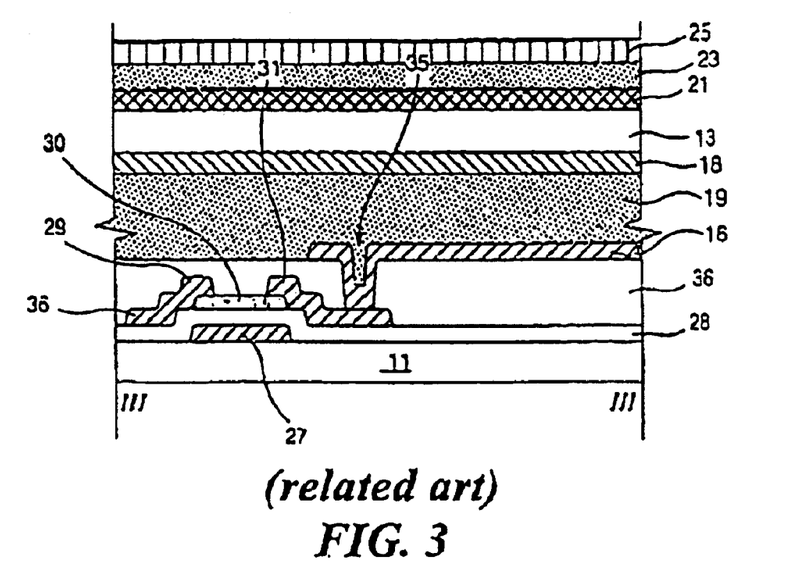
FIG. 3 is a cross-sectional view taken along a line "III—III" of FIG. 2.

Now, with reference to FIG. 3, a fabricating process for the conventional reflective LCD device is explained. At first, on the lower substrate 11, a first metal is deposited and patterned to form the gate line 33 (see FIG. 2) and gate electrode 27 that is integrally protruded from the gate line 33. The first metal is selected from a group consisting of chromium (Cr), molybdenum (Mo), aluminum (Al), aluminum alloy, and tungsten (W).

Then, a gate-insulating layer 28 is formed on the lower substrate 11 to cover the gate line 33 (see FIG. 2) and gate electrode 27. The gate-insulating layer 28 is made of an inorganic insulating material, usually silicon oxide ($SiO_x$) and silicon nitride ($SiN_x$), or an organic insulating material, usually benzocyclobutene (BCB) and acryl.

On the gate-insulating layer 28, an amorphous silicon layer and a doped amorphous silicon layer are deposited and patterned to form the active layer 30 in an island shape. Thereafter, on the gate-insulating layer 28 where the active layer 30 is formed, a second metal is deposited and patterned to form the data line 36, source electrode 29, and drain electrode 31. The source electrode 29 is integrally protruded from the data line 36, and the drain electrode 31 is spaced from the source electrode 29. The second metal for the data line 36, and source and drain electrode 29 and 31 is usually the same material as the first metal for the gate line and gate electrode 27. Then, to cover the second metal layer, an organic insulating material, usually benzocyclobutene (BCB) or acryl is deposited as a passivation layer 36. The passivation layer 36 is patterned such that the drain contact hole 35 is formed over the drain electrode 31.

Thereafter, an opaque metal having a superior light-reflection property is deposited and patterned on the passivation layer 36 to form the reflective electrode 16 in the pixel region "P" of FIG. 2. As previously explained, the reflective electrode 16 electrically contacts the drain electrode 31 via the drain contact hole. Aluminum (Al) is conventionally used for the reflective electrode 16.

Thereafter, the lower substrate 11 is attached with the upper substrate 13 having the common electrode 18 on its inner surface, and the liquid crystal layer 19 is interposed between the upper and lower substrates 13 and 11. At this point, the diffusion plate 21 is conventionally formed on the exterior surface of the upper substrate 13. The diffusion plate 21 diffuses light such that high brightness and a wide viewing angle can be achieved.

However, due to the diffusion plate 21, the material cost of the LCD device increases.

Figure 4:
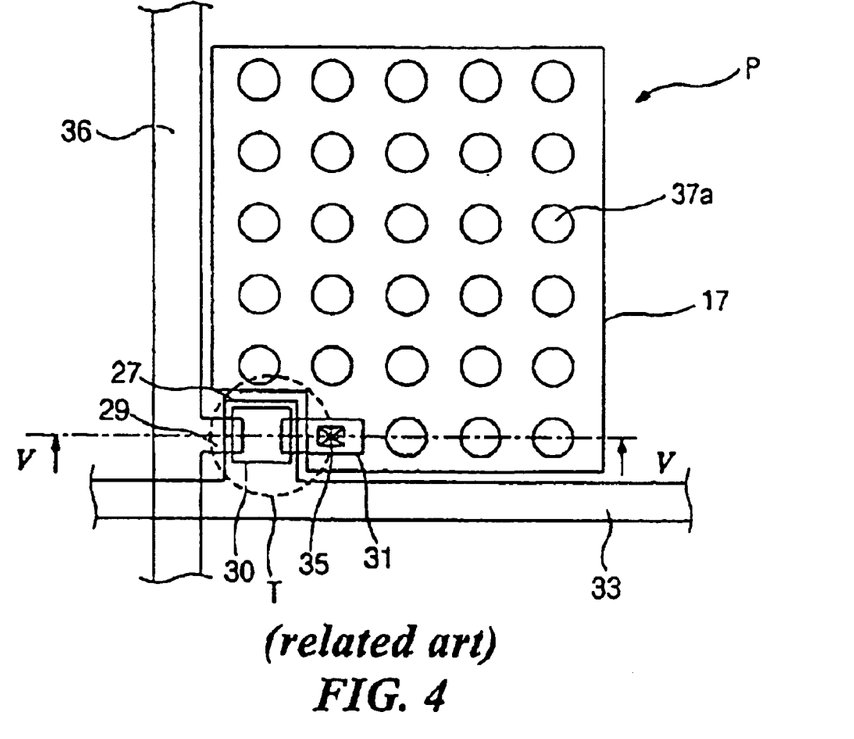
FIG. 4 is a plane view of another conventional reflective LCD device.
Figure 5:
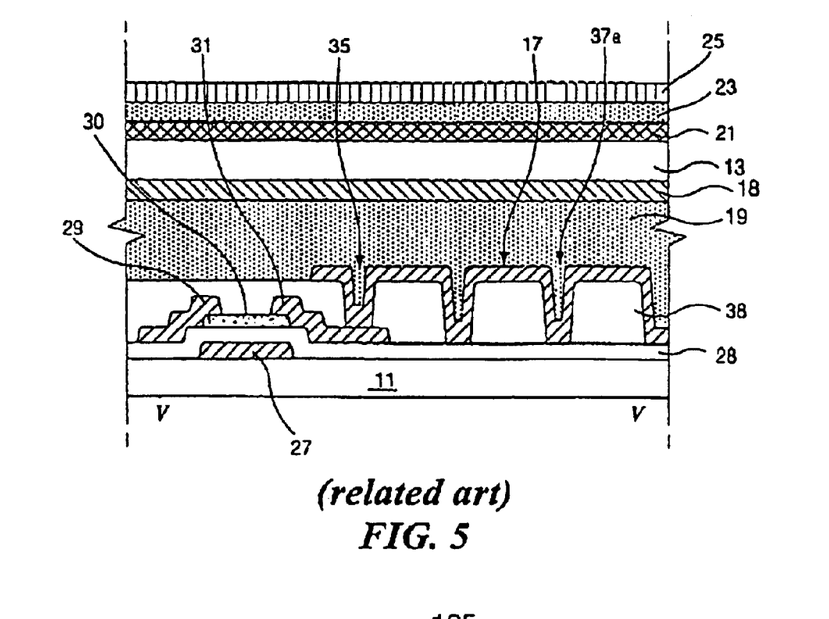
FIG. 5 is a cross-sectional view taken along a line "V—V" of FIG. 4.

FIGS. 4 and 5 show another conventional reflective LCD device. As shown in FIG. 4, a reflective electrode 17 having a plurality of concave portions 37a thereon is formed on the pixel region "P". The concave portions 37a reflect incident light in various directions such that a diffusion effect can be achieved. With reference to FIG. 5, a fabricating process for the reflective LCD device of FIG. 4 is explained. After the source and drain electrodes 29 and 31 are formed via the same steps explained in FIG. 3, a passivation layer 38 is formed on the gate-insulating layer 28. The passivation layer 38 covers the source and drain electrodes 29 and 31. Then, the passivation layer 38 is patterned to have the drain contact hole 35 and concave portions corresponding to the concave portions 37a of FIG. 1. Thereafter, an opaque metal, usually aluminum is deposited and patterned on the passivation layer 38 including the concave portions. Therefore, the reflective electrode 17 having a plurality of concave portions 37a is formed on the pixel region.

In the above-described conventional reflective LCD device, the reflective electrode 17 serves to diffuse light, instead of the diffusion plate of the first conventional reflective LCD device shown in FIG. 3. Therefore, the material cost is relatively low.

However, due to the complicated patterning process for forming the concave portions 37a, the fabrication yield decreases. Further, since the size of the concave portion is limited, the diffusion effect by the concave reflective electrode is also limited.

SUMMARY OF THE INVENTION

Accordingly, the present invention is directed to a reflective LCD device that substantially obviates one or more of the problems due to limitations and disadvantages of the related art.

An object of the present invention is to provide a reflective LCD device having an embossed reflective electrode.

In order to achieve the above object, a fabricating method for a liquid crystal display device includes: forming a gate line including a gate electrode on a substrate; forming a gate-insulating layer on the substrate, the gate-insulating layer covering the gate line and gate electrode; forming an active layer on the gate-insulating layer; forming a data line, a source electrode and a gate electrode on the active layer; forming a passivation layer on the gate-insulating layer, the passivation layer covering the data line, source electrode and gate electrode; dry-etching a surface of the passivation layer with gas such that the surface is embossed; and forming a reflective electrode on the embossed surface of the passivation layer such that an exterior surface of the reflective electrode is embossed.

The gas used for the dry-etching is beneficially a mixture gas of $SF_6+O_2$ or $CF_4+O_2$. Instead of the mixture gas, $O_2$ gas can be used for the dry-etching.

The passivation layer preferably includes an organic insulating material, and the organic insulating material is preferably benzocyclobutene (BCB).

The reflective electrode is preferably an opaque conductive metal, and the opaque conductive metal is preferably an aluminum based metal.

In another aspect, the present invention provides a liquid crystal display device, which includes: upper and lower substrates with a liquid crystal layer interposed therebetween; gate line and gate electrode on the lower substrate; a gate-insulating layer on the lower substrate, the gate-insulating layer covering the gate line and gate electrode; an active layer on the gate-insulating layer; source electrode and drain electrode on the active layer; a data line on the gate-insulating layer; a passivation layer on the data line, source electrode, and drain electrode; and an embossed reflective electrode on the passivation layer.

The passivation layer preferably includes an organic insulating material, and the organic insulating material is preferably benzocyclobutene (BCB).

The reflective electrode is preferably an opaque conductive metal, and the opaque conductive metal is preferably an aluminum based metal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to a preferred embodiment of the present invention, an example of which is illustrated in the accompanying drawings.

Figure 6:
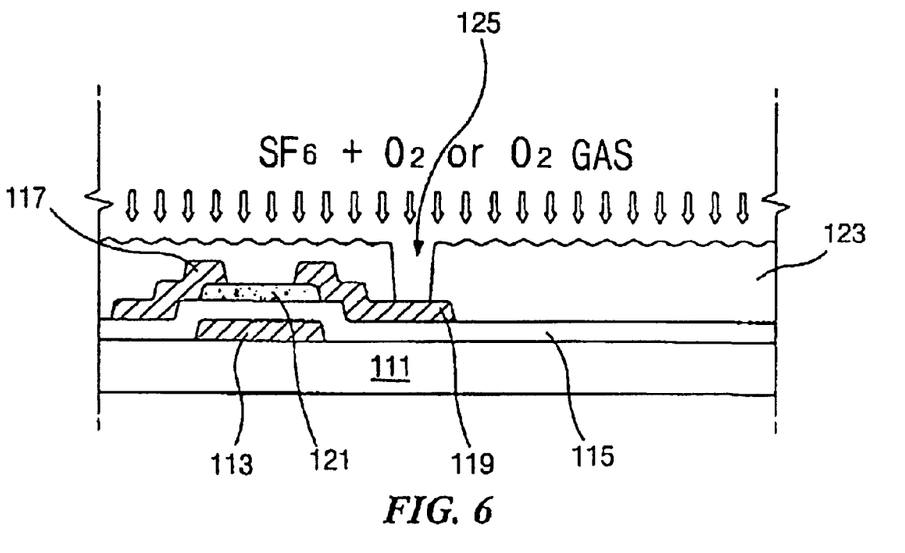
FIGS. 6 and 7 are cross-sectional views of a reflective LCD device according to a preferred embodiment of the present invention.

In the preferred embodiment, a reflective electrode of a reflective LCD device is embossed without a mask patterning process. With reference to FIG. 6, a fabricating process for a reflective LCD device is explained. At first, on a lower substrate 111, a first metal is deposited and patterned to form a gate line and a gate electrode 113 that is integrally protruded from the gate line (see FIG. 2). The first metal is preferably selected from a group consisting of chromium (Cr), molybdenum (Mo), aluminum (Al), aluminum alloy, and tungsten (W). Then, a gate-insulating layer 115 is formed on the lower substrate 111 to cover the gate line and gate electrode 113. The gate-insulating layer 115 is preferably made of an inorganic insulating material, usually silicon oxide ($SiO_X$) and silicon nitride ($SiN_X$), or an organic insulating material, usually benzocyclobutene (BCB) and acryl.

On the gate-insulating layer 115, an amorphous silicon layer and a doped amorphous silicon layer are deposited and patterned to form an active layer 121 in an island shape. Thereafter, on the gate-insulating layer 115 where the active layer 121 is formed, a second metal is deposited and patterned to form a data line, a source electrode 117, and a drain electrode 119. The source electrode 117 is integrally protruded from the data line (see FIG. 2), and the drain electrode 119 is spaced from the source electrode 117. The second metal for the data line, source electrode 117, and drain electrode 119 preferably has the same material as the first metal for the gate line and gate electrode 113.

Then, to cover the second metal layer, an organic insulating material, preferably benzocyclobutene (BCB) is deposited as a passivation layer 123. The BCB includes silicon (Si) and carbon (C) for its compound. The passivation layer 123 is patterned such that a drain contact hole 125 is formed over the drain electrode 119. After the patterning, the passivation layer 123 is embossed via a dry-etching method with a gas, beneficially a mixture gas of $SF_6+O_2$ or $CF_4+O_2$. In the dry-etching step with the mixture gas, silicon (Si) of the BCB is etched away as a new compound $SiF_X$ such that a great number of small concave and convex portions are formed on an exterior surface of the passivation layer 123.

At this point, the embossing rate of the passivation layer 123 is controlled by the etching time, a mixture ratio of the mixture gas, the mixture gas itself, or the like. In a test, when $SF_6+O_2$ gases are used, it takes about 50 seconds to form a desired embossing on the passivation layer. Instead of the mixture gas, oxygen ($O_2$) may be used for the same purpose of embossing the layer surface. In that case, carbon (C) of the BCB is etched away as a new compound $CO_X$, and it takes about 150 seconds to form a desired embossing on the passivation layer 123. This dry-etching method with oxygen gas is usually referred to as the oxygen-ashing method.

Figure 7:
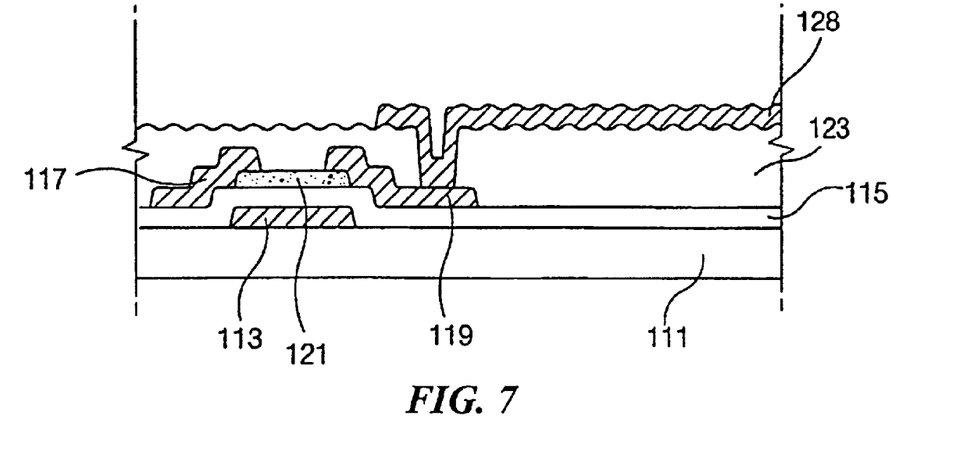

Thereafter, as shown in FIG. 7, an opaque conductive metal is deposited on the embossed surface of the passivation layer 123 to form a reflective electrode 128. Therefore, the reflective electrode 128 also has an embossed surface along the passivation layer 123. The reflective metal preferably has a superior reflection property. Aluminum (Al) is preferably used for the reflective electrode 128 because it has a good contact property with the passivation layer 123 such that gaps between the reflective electrode 128 and the passivation layer 123 are reduced.

Figure 8:
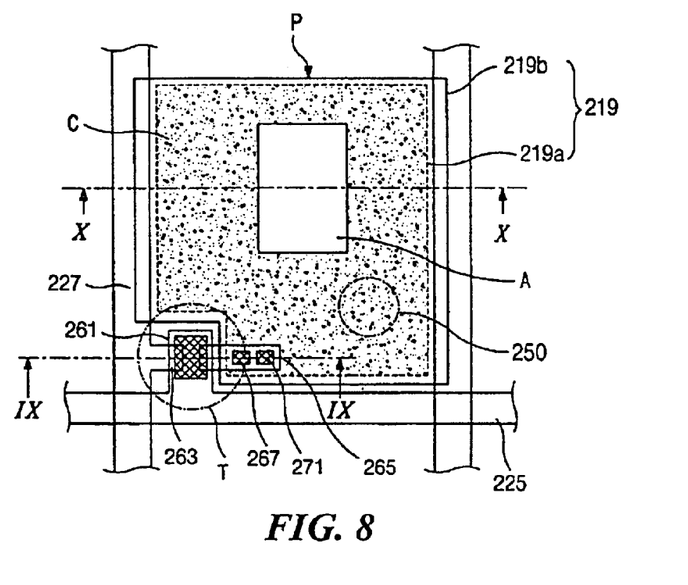
FIG. 8 is a plan view illustrating a transflective LCD device according to the preferred embodiment of the present invention.
Figure 9:
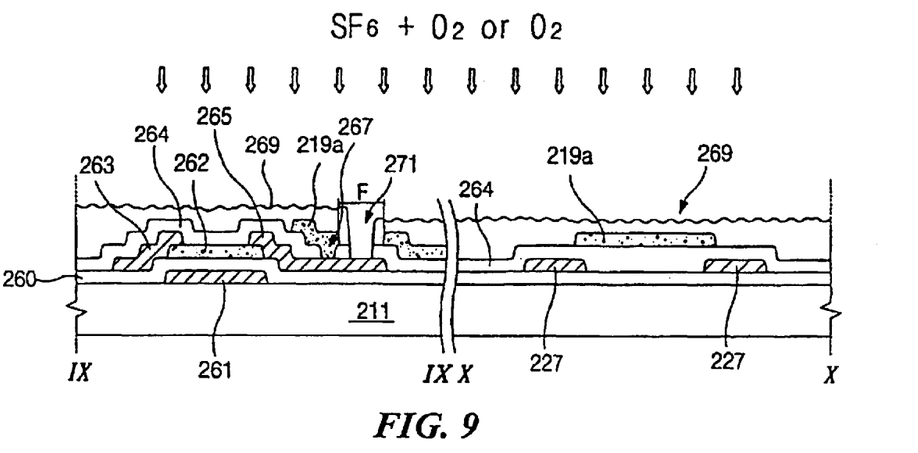
FIGS. 9 and 10 are cross-sectional views taken along lines "IX—IX" and "X—X" of FIG. 8.
Figure 10:
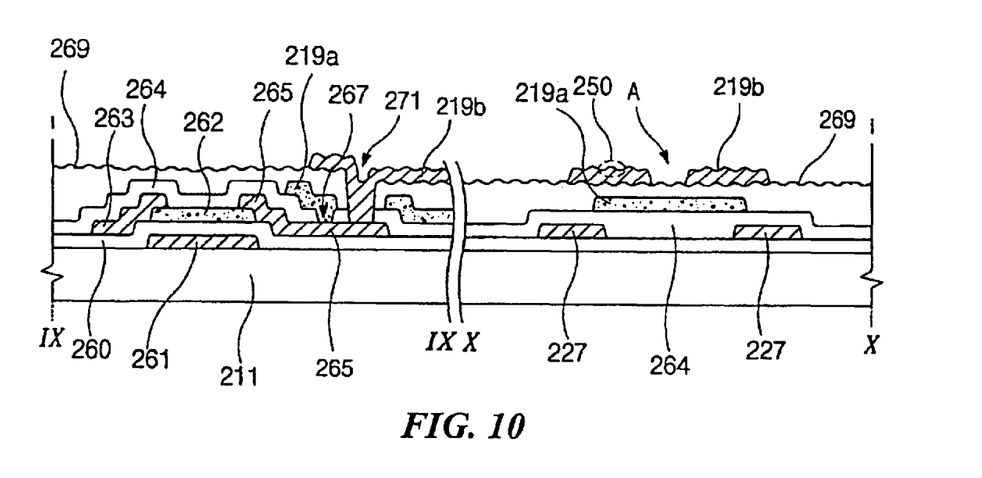

The above-mentioned first and second embossing method may be applied to a transflective LCD device, which has a transmissive hole on a reflective electrode. With reference to FIGS. 8 to 10, the transflective LCD device is explained.

FIG. 8 is a plan view illustrating a pixel region "P" of a transflective LCD device according to a preferred embodiment. As shown, a gate line 225 is transversely formed, and a data line 227 is formed perpendicular to the gate line 225. At a cross point between the gate and data lines 225 and 227, a thin film transistor (TFT) "T" is formed. The TFT "T" includes a gate electrode 261, a source electrode 263, and a drain electrode 265.

On the pixel region "P" defined by the gate and data lines 225 and 227, a pixel electrode 219 is formed. The pixel electrode 219 includes a transparent electrode 219a with a reflective electrode 219b formed over the transparent electrode 219a. A transmissive hole "A" is formed on the reflective electrode 219b such that a portion of the transparent electrode 219a is exposed. Therefore, the pixel electrode 219 serves as a transflective electrode including both a reflective portion "C" and a transmissive portion "A", or a transmissive hole. The transparent electrode 219a electrically contacts the drain electrode 265 via a first drain contact hole 267, while the reflective electrode 219b electrically contacts the drain electrode 265 via a second drain contact hole 271. At this point, the reflective electrode 219b preferably has a great number of small concave and convex portions 250 on its exterior surface, according to the preferred embodiment.

With reference to FIGS. 9 and 10, a fabricating process for the above-mentioned inventive transflective LCD device is explained.

FIG. 9 is a cross-sectional view taken along lines "IX—IX" and "X—X" of FIG. 8. At first, on a lower substrate 211, a first metal is deposited and patterned to form a gate line 225 (see FIG. 8) and a gate electrode 261 that is integrally protruded from the gate line. The first metal is preferably selected from a group consisting of chromium (Cr), molybdenum (Mo), aluminum (Al), aluminum alloy, and tungsten (W). Then, a second insulating layer, or a gate-insulating layer 260 is formed on the lower substrate 211 to cover the gate line (reference 225 of FIG. 8) and gate electrode 261. The gate-insulating layer 260 is preferably made of an inorganic insulating material, usually silicon oxide ($SiO_X$) and silicon nitride ($SiN_X$), or an organic insulating material, usually benzocyclobutene (BCB) and acryl.

On the gate-insulating layer 260, an amorphous silicon layer and a doped amorphous silicon layer are deposited and patterned to form an active layer 262 in an island shape. Thereafter, on the gate-insulating layer 260 where the active layer 262 is formed, a second metal is deposited and patterned to form the data line 227 (see FIG. 8), source electrode 263, and drain electrode 265. The source electrode 263 is integrally protruded from the data line 227 (see FIG. 8), and the drain electrode 265 is spaced from the source electrode 263. The second metal for the data line, source electrode 263, and drain electrode 265 preferably has the same material as the first metal for the gate line 225 (see FIG. 8) and gate electrode 261.

Thereafter, a second insulating layer 264 is formed to cover the above-mentioned source electrode 263, drain electrode 265, and active layer 262. The second insulating layer 264 preferably has the same material as the gate-insulating layer 260. On the second insulating layer 264, the first drain contact hole 267 is formed to expose a portion of the drain electrode 265.

Then, a transparent conductive material, preferably indium tin oxide (ITO) is deposited and patterned on the second insulating layer 264 such that the transparent electrode 219a is formed on the pixel region "P" of FIG. 8. The transparent electrode 219a electrically contacts the drain electrode 265 via the first drain contact hole 267. The transparent electrode 219a includes a through hole "F" that corresponds to the second drain contact hole 271 of a passivation layer 269, which will be formed in a subsequent step.

On the transparent electrode 219a, a passivation layer 269 is formed from benzocyclobutene (BCB). Then, the passivation layer 269 and the second insulating layer 264 are patterned to produce the second drain contact hole 271 that communicates with the through hole "F" of the transparent electrode 219a. After the patterning step, the passivation layer 269 is embossed via the dry-etching method with a mixture gas of $SF_6+O_2$ or $CF_4+O_2$, or via the oxygen-ashing method with $O_2$ gas.

Thereafter, as shown in FIG. 10, an opaque conductive metal is deposited on the embossed surface of the passivation layer 269 to form the reflective electrode 219b. Therefore, the reflective electrode 219b also has an embossed surface along the passivation layer 269. The reflective electrode 219b is patterned to have the transmissive hole "A", which exposes a portion of the transparent electrode 219a.

The above-mentioned embossed reflective electrode 219b according to the preferred embodiment may be applied to another LCD device that employs a reflective electrode to reflect ambient light. Since the reflective electrode is easily embossed via the above-mentioned dry-etching method or oxygen ashing method, high luminance and a wide viewing angle can be achieved without a complicated mask patterning process for a conventional reflective LCD device shown in FIGS. 4 and 5.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A fabricating method for an array substrate of a liquid crystal display device, the method comprising:

forming a gate line including a gate electrode on a substrate;

forming a gate-insulating layer on the substrate, the gate-insulating layer covering the gate line and gate electrode;

forming an active layer on the gate-insulating layer;

forming a data line, a source electrode and a drain electrode on the active layer;

forming a passivation layer on the gate-insulating layer, the passivation layer covering the data line, source electrode and drain electrode;

dry-etching a surface of the passivation layer with a gas without using a photo mask such that the surface is embossed and has a plurality of random uneven portions; and forming a reflective electrode on the embossed surface of the passivation layer such that an exterior surface of the reflective electrode is embossed.

2. The method of claim 1, wherein the gas used for the dry-etching is a mixture gas of $SF_6+O_2$.

3. The method of claim 1, wherein the gas used for the dry-etching is a mixture gas of $CF_4+O_2$.

4. The method of claim 1, wherein the gas used for the dry-etching is $O_2$ gas.

5. The method of claim 1, wherein the passivation layer includes an organic insulating material.

6. The method of claim 5, wherein the organic insulating material is benzocyclobutene (BCB).

7. The method of claim 1, wherein the reflective electrode is an opaque conductive metal.

8. The method of claim 7, wherein the opaque conductive metal is an aluminum based metal.

9. The method of claim 1, further including forming a contact hole in the passivation layer prior to forming a reflective electrode on the embossed surface of the passivation layer such that an exterior surface of the reflective electrode is embossed.

10. The method of claim 1, further including forming a contact hole in the passivation layer prior to dry-etching the surface of the passivation layer.

11. A liquid crystal display device comprising:

upper and lower substrates with a liquid crystal layer interposed therebetween;

a gate line and a gate electrode on the lower substrate;

a gate-insulating layer on the lower substrate, the gate-insulating layer covering the gate line and gate electrode;

an active layer on the gate-insulating layer;

a source electrode and a electrode on the active layer;

a data line on the gate-insulating layer;

a passivation layer on the data line, source electrode, and drain electrode, an entire surface of the passivation layer being embossed by a dry etching and having a plurality of random uneven portions; and an embossed reflective electrode on the passivation layer.

12. The device of claim 11, wherein the passivation layer includes an organic insulating material.

13. The device of claim 11, wherein the organic insulating material is benzocyclobutene (BCB).

14. The device of claim 11, wherein the reflective electrode is an opaque conductive metal.

15. The device of claim 14, wherein the opaque conductive metal is an aluminum based metal.

16. A method of fabricating an array substrate for a liquid crystal display device, the method comprising:

forming a gate line including a gate electrode on a substrate;

forming a first insulating layer on the substrate, the first insulating layer covering the gate line and gate electrode;

forming an active layer on the first insulating layer;

forming a data line, a source electrode and a drain electrode on the active layer, forming a second insulating layer on the data line, source electrode and drain electrode;

forming a first contact hole in the second insulating layer, exposing a first portion of the drain electrode;

forming a transparent electrode contacting the drain electrode via the first contact hole;

forming a passivation layer on the first insulating layer and transparent electrode;

forming a second contact hole in the passivation layer and the second insulating layer, exposing a second portion of the drain electrode;

dry-etching a surface of the passivation layer with a gas such that the surface is embossed; and forming a reflective electrode on the embossed surface of the passivation layer such that an exterior surface of the reflective electrode is embossed.

17. The method of claim 16, wherein the gas used for the dry-etching is a mixture gas of $SF_6+O_2$.

18. The method of claim 16, wherein the gas used for the dry-etching is a mixture gas of $CF_4+O_2$.

19. The method of claim 16, wherein the gas used for the dry-etching is $O_2$ gas.

20. The method of claim 16, wherein the passivation layer includes an organic insulating material.

21. The method of claim 20, wherein the organic insulating material is benzocyclobutene (BCB).

22. The method of claim 16, wherein the reflective electrode is an opaque conductive metal.

23. The method of claim 22, wherein the opaque conductive metal is an aluminum based metal.

24. A liquid crystal splay device comprising:

upper and lower substrates with a liquid crystal layer interposed therebetween;

a gate line and a gate electrode on the lower substrate;

a first insulating layer on thee lower substrate, the first insulating layer covering the gate line and gate electrode;

an active layer on the gate-insulating layer;

a source electrode and a drain electrode on the active layer; a data line on the gate-insulating layer;

a second insulating layer on the data line, source electrode and drain electrode;

a transparent electrode of the second insulating layer;

a passivation layer on the second insulating layer and the transparent electrode; and an embossed reflective electrode on the passivation layer.

25. The device of claim 24, wherein the passivation layer includes an organic insulating material.

26. The device of claim 24, wherein the organic insulating material is benzocyclobutene (BCB).

27. The device of claim 24, wherein the reflective electrode is an opaque conductive metal.

28. The device of claim 27, wherein the opaque conductive metal is an aluminum based metal.

29. The method of claim 2, wherein the surface of the passivation layer is dry-etched for a time period shorter than about 50 sec.

30. The method of claim 3, wherein the surface or the passivation layer is dry-etched for a time period shorter than about 50 sec.

31. The method of claim 4, wherein the surface of the passivation layer is dry-etched for a time period shorter than about 150 sec.

* * * * *